(12) United States Patent
Chong et al.

(10) Patent No.: US 7,496,700 B1
(45) Date of Patent: Feb. 24, 2009

(54) SERIAL TUNNELING PROTOCOL (STP) FLOW CONTROL IN SAS EXPANDERS WITHOUT SATA LINK STATE MACHINE

(75) Inventors: Paul Chong, Vancouver (CA); Heng Liao, Belcarra (CA); Cheng Yi, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 393 days.

(21) Appl. No.: 11/326,505

(22) Filed: Jan. 6, 2006

Related U.S. Application Data

(60) Provisional application No. 60/643,143, filed on Jan. 12, 2005.

(51) Int. Cl.
*G06F 5/00* (2006.01)
*G06F 13/12* (2006.01)
*G06F 15/16* (2006.01)

(52) U.S. Cl. .................... 710/52; 710/57; 710/65; 709/230

(58) Field of Classification Search .................... 710/52, 710/57, 65; 709/230
See application file for complete search history.

(56) References Cited

U.S. PATENT DOCUMENTS

| | | | |
|---|---|---|---|
| 5,237,660 A | 8/1993 | Weber et al. | |
| 5,664,114 A * | 9/1997 | Krech et al. | 709/234 |
| 5,696,990 A | 12/1997 | Rosenthal et al. | |
| 6,088,412 A * | 7/2000 | Ott | 375/372 |
| 6,249,756 B1 | 6/2001 | Bunton et al. | |
| 6,829,663 B1 * | 12/2004 | Ghaffari et al. | 710/71 |
| 2004/0019718 A1 * | 1/2004 | Schauer et al. | 710/105 |
| 2004/0100944 A1 * | 5/2004 | Richmond et al. | 370/360 |
| 2004/0120189 A1 * | 6/2004 | Schauer | 365/189.01 |
| 2005/0138191 A1 * | 6/2005 | Seto et al. | 709/230 |

OTHER PUBLICATIONS

American National Standards Institute, Inc., "AT Attachment with Packet Interface—7 vol. 3 Serial Transport Protocols and Physical Interconnect (ATA/ATAPI-7 V3)" Apr. 21, 2004, p. iii, 7, 19, 23, 98, 121-122, 124.*

* cited by examiner

*Primary Examiner*—Tariq Hafiz
*Assistant Examiner*—Jonathan R Plante
(74) *Attorney, Agent, or Firm*—Curtis B. Behmann; Borden Ladner Gervais LLP

(57) ABSTRACT

A method and apparatus are disclosed for implementing STP flow control in SAS expander devices. SAS expanders are commonly used within a SAS network topology to allow multiple disk drives to connect to multiple host devices. Connections to a SATA HDD are supported using SATA Tunnelling Protocol (STP), which allows SATA traffic to be carried over a SAS network topology. Flow control in a STP connection is applied through a set of special SATA primitives, both for forward and backward flow control. A method is described herein in which STP flow control is supported without the use of a SATA link layer state machine. This allows STP flow control to be terminated on a hop-by-hop basis without knowing the data channel direction or maintaining a SATA link state machine, and while minimizing gate count.

7 Claims, 11 Drawing Sheets

SERIAL TUNNELING PROTOCOL (STP) FLOW CONTROL IN SAS EXPANDERS WITHOUT SATA LINK STATE MACHINE

RELATED APPLICATIONS

The present invention claims priority from U.S. Provisional Patent Application Ser. No. 60/643,143 filed on 12 Jan. 2005 and herein incorporated by reference in its entirety.

FIELD OF THE INVENTION

The present invention relates generally to protocols relating to the physical interconnection of storage devices. More particularly, the present invention relates to the Serial Attached SCSI (SAS) protocol and broadcast primitives used in conjunction with that protocol to implement flow control.

BACKGROUND OF THE INVENTION

Serial Attached SCSI (Small Computer System Interface), or SAS, is a connection-oriented protocol that allows storage devices, like servers and disk drives, to communicate through a network of high-speed serial physical interconnects. Connections between a host device and a target drive are managed by intermediate devices called expanders. SAS expanders act as connection management agents, much like a switch element, having physical connections to multiple host devices or disk drives simultaneously.

The SAS specification defines three transport level protocols, which are used in a SAS topology under different circumstances: Serial SCSI Protocol (SSP), Serial Management Protocol (SMP), Serial Advanced Technology Attachment Tunnelling Protocol (STP). An STP connection is set up when a SAS host device accesses a Serial Advanced Technology Attachment (SATA) disk drive or vice versa. Once the connection is set up, data transfer occurs between the host device and the disk as per the SATA protocol, at a half-duplex rate.

The SATA protocol makes use of 32-bit constructs called Dwords and special control Dwords, called primitives. All SATA primitives are either repeated or singular. Repeated primitives are redundant control Dwords that are required to be sent two at a time. Single primitives are control Dwords with no such restriction. A repeated primitive indicates a data transmitter or receiver state whereas a single primitive is associated instead with a particular Dword position. For example, an X_RDY repeated primitive indicates that a data frame (referred to as a frame information structure, or FIS) is ready for transmission. Likewise, an R_RDY repeated primitive indicates that a data receiver is ready for frame reception. These primitives indicate a transmitter or receiver state. In contrast, a single primitive such as SOF marks a specific Dword (in this case, the position of the start of frame). For reference, all SATA primitives, along with their respective functions, are listed in the table below:

TABLE 1

| DMAT | DMA terminate. Sent by a data receiver in order to terminate a FIS transfer. | Single |
|---|---|---|
| EOF | End of frame Dword. If a data receiver is in the midst of receiving a FIS, the preceding data Dword shall be considered as the CRC Dword of the FIS. | Single |
| HOLD | Hold data transmission. Sent by a data transmitter when it temporarily has no more data to send. Also sent by a data receiver to throttle the flow of data in the forward channel. | Repeated |
| HOLDA | Hold acknowledge. Sent by a data transmitter or receiver to acknowledge reception of a HOLD primitive. | Repeated |
| PMACK | Power management acknowledge. Sent by a disk to acknowledge a power management request. | Single |
| PMNAK | Power management denial. Sent by a disk to refuse a power management request. | Single |
| PMREQ_P | Power management request to partial. Sent by a host device to place a disk into a power management partial mode. | Repeated |
| PMREQ_S | Power management request to slumber. Sent by a host device to place a disk into a power management slumber mode. | Repeated |
| R_ERR | Reception error. Sent by a data receiver to indicate that a FIS was not was received correctly. | Repeated |
| R_IP | Reception in progress. Sent by a data receiver to indicate that FIS reception is in progress. | Repeated |
| R_OK | Reception with no error. Sent by a data receiver indicating that a FIS was received correctly. | Repeated |
| R_RDY | Receiver ready. Sent by a data receiver to indicate that it is ready to receive a FIS. | Repeated |
| SOF | Start of frame. Precedes first data Dword of FIS. | Single |
| SYNC | Synchronization. Indicates an idle state. | Repeated |
| WTRM | Wait for frame termination. Sent by a data transmitter to indicate that a FIS has been transmitted and is now awaiting an R_OK or R_ERR from the data receiver. | Repeated |
| X_RDY | Transmission data ready. Sent by data transmitter to initiate a FIS transfer. | Repeated |

A typical FIS transfer via the SATA protocol is shown in FIG. 1. Note that an end device, whether host or disk, can act as either a transmitter or a receiver.

After an STP connection is set up, a SAS expander acts, by simple analogy, as nothing more than a wire would between the initiator and target. In fact, under normal operation, connection teardown can only be initiated by an end device. However, after an expander has set up an STP connection between a SAS host device and a SATA disk, the expander must still terminate flow control on a hop-by-hop basis. This is because the SATA protocol has defined a flow control mechanism in which forward data flow must be stopped within 21 Dwords of a data receiver generating HOLD primitives. Because of the latency introduced by the expander into the data path, flow control must be terminated at each hop (at each expander port), rather than by relying on an end device's link layer to do so. An example FIS transfer between two end devices with flow control on the back channel is shown in FIG. 2.

Another FIS transfer example featuring flow control is shown in FIG. 3. In this example, the data transmitter generates HOLD primitives after running out of data to send in the middle of a FIS. Here, unlike the backward channel flow control case, it is not catastrophic if HOLDA primitives are received after 21 Dwords, even though this is a clear violation of the SATA protocol. This is because the data transmitter does not take any consequential action after receiving either HOLDA primitives or R_IP primitives.

To properly terminate SATA flow control on a hop-by-hop basis, an expander port must respond to HOLD primitives with HOLDA primitives quickly enough that the total loop time, measured from the initiator of the HOLD primitives, meets the 21-Dword requirement. An elastic first-in-first-out queue (FIFO) for buffering a stream of data between sender and receiver is also required in each connection data path, both to account for this loop time delay when an expander port initiates flow control and to allow the synchronization of data from one expander port clock domain to another. When an expander port is acting as a data receiver, it should generate HOLD primitives (initiate flow control) once its forward channel FIFO does not have enough space to accommodate at least one loop time's worth of data. Ideally, this ensures that the FIFO will never overflow. FIG. 4 is a basic block diagram of an expander while inside a connection. Note that only the in-connection expander ports are shown here.

Termination of STP flow control in a SAS expander preferably provides a forward data channel FIFO per port and control logic to ensure that the following desirable characteristics, or requirements, are met (as stated in the SAS specification as published by the Internabonal Committee for Information Technology Standards of the American National Standards Institute as ANSI INCITS 376-2003):

1. When an STP port (i.e. an expander port in an STP connection) is transmitting a frame and receives HOLD, it shall transmit no more than 20 data Dwords for the frame and respond with HOLDA.

2. When an STP port is receiving a frame and its buffer begins to fill up, it shall transmit HOLD. After transmitting HOLD, it shall accept the following number of data Dwords for the frame:
   a) 24 Dwords when the line rate is 1.5 Gbps; or
   b) 28 Dwords when the line rate is 3.0 Gbps 3. When a SATA host port in an STP/SATA bridge (i.e. an expander port connected to a SATA disk) is receiving a frame from a SATA physical link, it shall transmit a HOLD primitive when it is only capable of receiving 21 more Dwords.

4. When a SATA host port in an STP/SATA bridge is transmitting a frame to a SATA physical link, it shall transmit no more than 19 data Dwords after receiving HOLD.

5. The data receiver (backward channel) must send HOLD primitives (initiate flow control) only while it is in the middle of receiving a FIS or after receiving a FIS but before R_OK/R_ERR is transmitted.

6. The data transmitter (forward channel) must send HOLD primitives (initiate flow control) only while it is in the middle of transmitting a FIS.

Note that each characteristic/requirement is specific to either the forward channel or the backward channel. This implies that the expander port control logic should be aware whether it is acting as a data transmitter or receiver (i.e., whether framed data is received on the ingress phy or is outgoing on the egress phy where "phy" is defined as the physical layer that provides the electrical and mechanical interface required for transmission and reception of data packets transferred across the given medium—e.g., serial bus). Each port should also be cognizant of FIS boundaries as HOLDA primitives are sent as a response to received HOLD primitives only while in the middle of a frame transfer. Furthermore, since a SAS topology allows for daisy-chained expanders, in which case a STP connection can straddle more than one expander device, the STP flow control strategy should satisfy these requirements both when an expander port is connected to an end device and when it is connected to another expander.

FIG. 5 illustrates a known example of how, based on the aforementioned requirements, flow control initiated by a data receiver can be propagated back to the data transmitter and terminated at each hop, while in a multi-expander STP connection.

While an expander port could conceivably ensure the flow control loop time requirement is met while maintaining data Dword integrity in connection by incorporating a complete SATA link state machine per port, this approach would be very costly. A less costly approach would therefore be desirable. There are very few approaches that specifically address the problem of STP flow control in SAS expanders. Several approaches to flow control, although in entirely different contexts, include U.S. Pat. No. 5,696,990 issued Dec. 9, 1997 to Rosenthal et al., U.S. Pat. No. 6,249,756 issued Jun. 19, 2001 to Bunton et al., and U.S. Pat. No. 5,237,660 issued Aug. 17, 1993 to Weber et al., each of which is incorporated herein by reference in their entirety.

It is, therefore, desirable to provide an improved STP flow control strategy to address the aforementioned flow control problem in a gate-efficient manner.

SUMMARY OF THE INVENTION

It is an object of the present invention to provide improved STP flow control strategies. Moreover, the present invention provides an expander port that ensures the flow control loop time requirement is met while maintaining data Dword integrity in connection by taking advantage of the redundant nature of the primitives that are sent on the back-channel (i.e., all primitives sent on the back-channel are repeated).

In a first aspect, the present invention provides an expander mechanism including an elastic buffer for buffering a stream of data between a sender and a receiver; a primitive decoder for identifying one or more control data-words from the stream of data as repeated primitives; and a link connection controller for filling the elastic buffer with the stream of data followed, upon identification of a first known type of repeated primitive from the stream of data, with at least two repeated primitives of the first known type while discarding subsequent data-words identical to the at least two repeated primitives of the first known type.

In a second aspect, the present invention provides a SAS expander for conditionally terminating repeated primitives at a data path buffer including a receiver portion; a transmitter portion; a forward channel FIFO located between the receiver portion and the transmitter portion and within a forward channel data path; a backward channel FIFO located between the receiver portion and the transmitter portion and within a backward channel data path; each receiver portion and the transmitter portion including a primitive decoder and a link connection controller having a programmable threshold to indicate whether a repeated primitive identified by the primitive decoder is to be discarded or written to the forward channel FIFO during a forward path transmission or the backward channel FIFO during a backward path transmission.

In a third aspect, the present invention provides a method of STP flow control in a SAS expander including: when primitives of a first type are received by the SAS expander, forwarding the primitives of the first type through an ingress buffer and sending primitives of a second type on an egress buffer; when the primitives of the first type are not received by the SAS expander, but the primitives of the second type are received, discarding a data word incoming to the SAS expander; when neither the primitives of the first type nor the primitives of the second type are received by the SAS expander and a fill level of the ingress buffer is not greater than a threshold, writing the data word to the ingress buffer; when neither the primitives of the first type nor the primitives of the second type are received by the SAS expander and the fill level of the ingress buffer is greater than the threshold and the data word is a repeatable data word, discarding the data word incoming to the SAS expander; and when neither the primitives of the first type nor the primitives of the second type are received by the SAS expander and the fill level of the ingress buffer is greater than the threshold and the data word is not a repeatable data word, writing the data word to the ingress buffer; wherein the primitives of the first type and the primitives of the second type are interlocking relative to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and apparatus for implementing STP flow control in SAS expander devices. SAS expanders are commonly used within a SAS network topology to allow multiple disk drives to connect to multiple host devices. Connections to a SATA HDD are supported using SATA Tunnelling Protocol (STP), which allows SATA traffic to be carried over a SAS network topology. Flow control in a STP connection is applied through a set of special SATA primitives, both for forward and backward flow control. A conventional method for a SAS expander to support STP flow control incorporates a SATA link layer state machine on every physical link. A new, more cost-effective method is described herein in which STP flow control is supported without the use of a SATA link layer state machine. This allows STP flow control to be terminated on a hop-by-hop basis without knowing the data channel direction or maintaining a SATA link state machine, and while minimizing gate count.

The present invention addresses the problem of STP flow control in SAS expander devices. However, this method is also applicable to flow control in non-SAS, half-duplex applications, wherein a maximum flow control loop time is defined and where stuffing words are inserted to stall the transfer of data. The present invention allows for an efficient, low-gate count method by which STP flow control is applied by a SAS expander port in an STP connection. Such method ensures that a maximum flow control loop time requirement can be met while maintaining data Dword integrity.

As mentioned above, a possible (albeit costly) solution to the STP flow control problem is to incorporate a SATA link state machine (as per the SATA standard) for each expander port. In contrast, the alternative innovative approach according to the preferred embodiment of the present invention takes advantage of back-channel properties to yield a more elegant solution.

Figure 1:
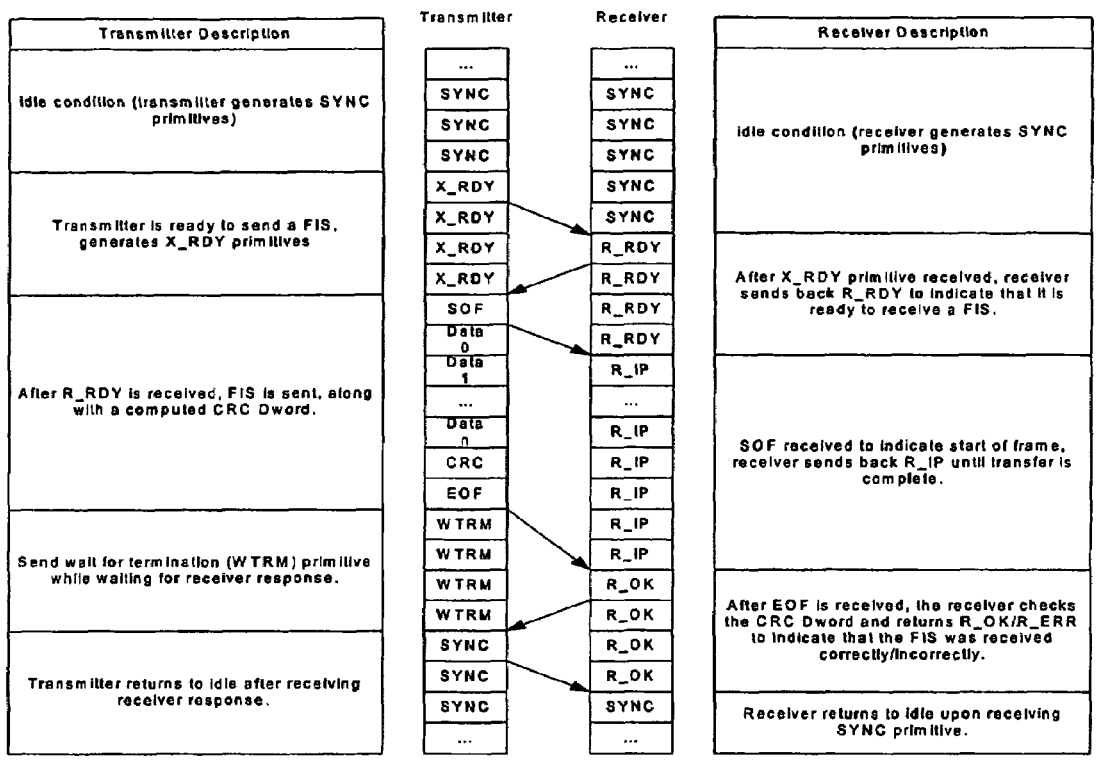
FIG. 1 illustrates a known SATA file information structure transfer.
Figure 2:
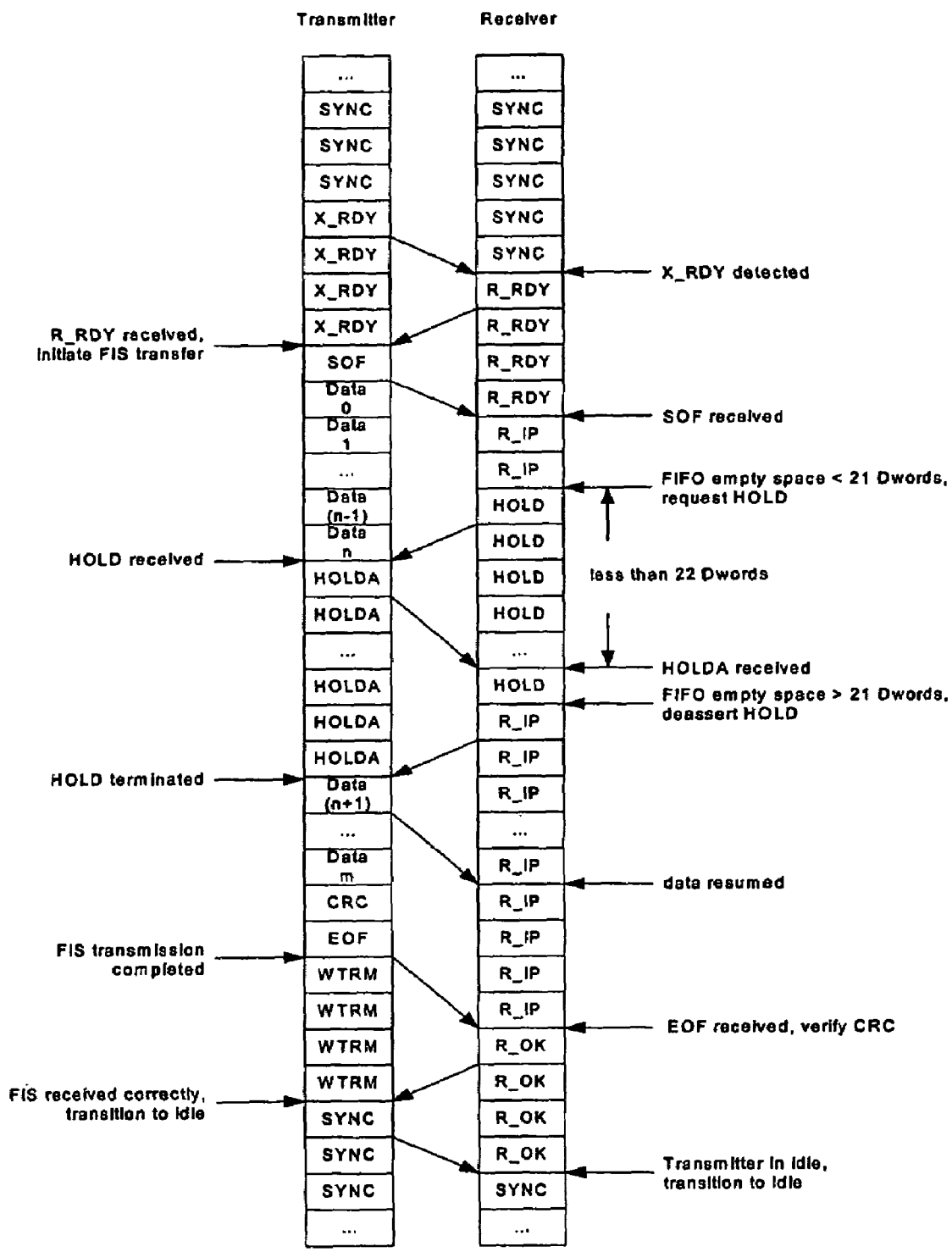
FIG. 2 illustrates a known backward channel SATA flow control.
Figure 3:
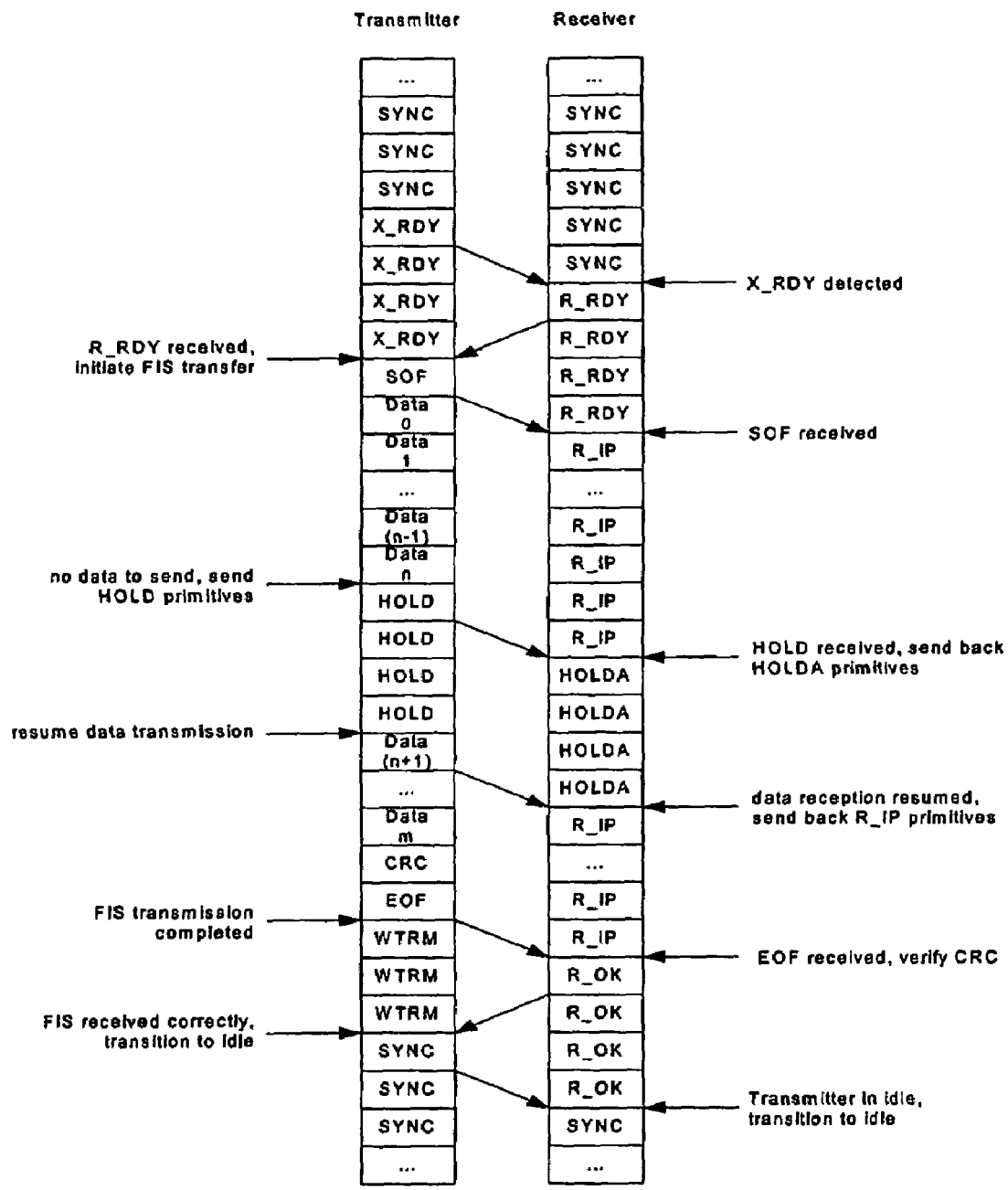
FIG. 3 illustrates a known forward channel SATA flow control.
Figure 4:
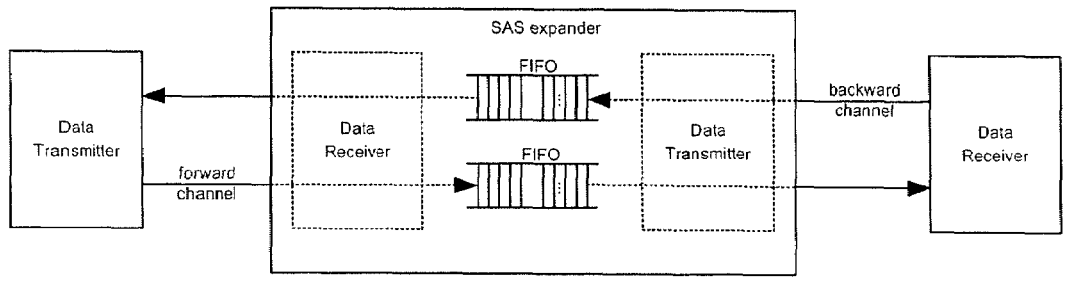
FIG. 4 is a block diagram of a known in-connection expander.
Figure 5:
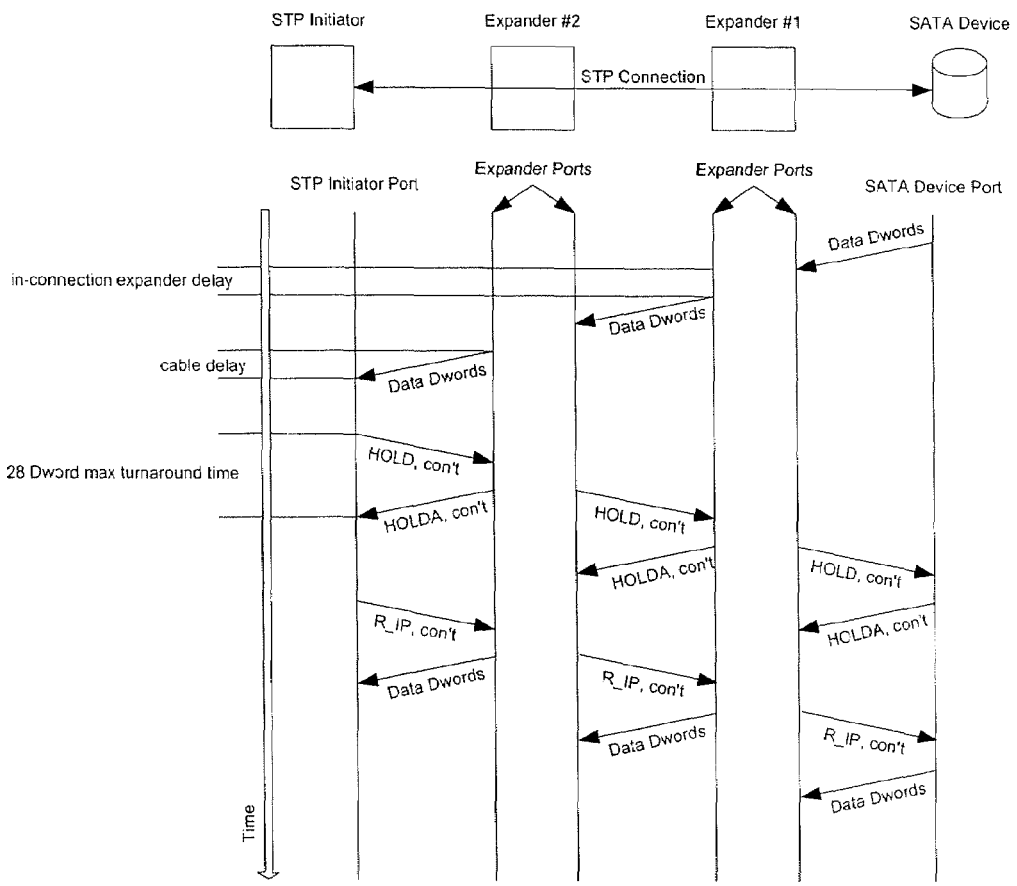
FIG. 5 is an example of known multi-expander STP flow control.
Figure 6:
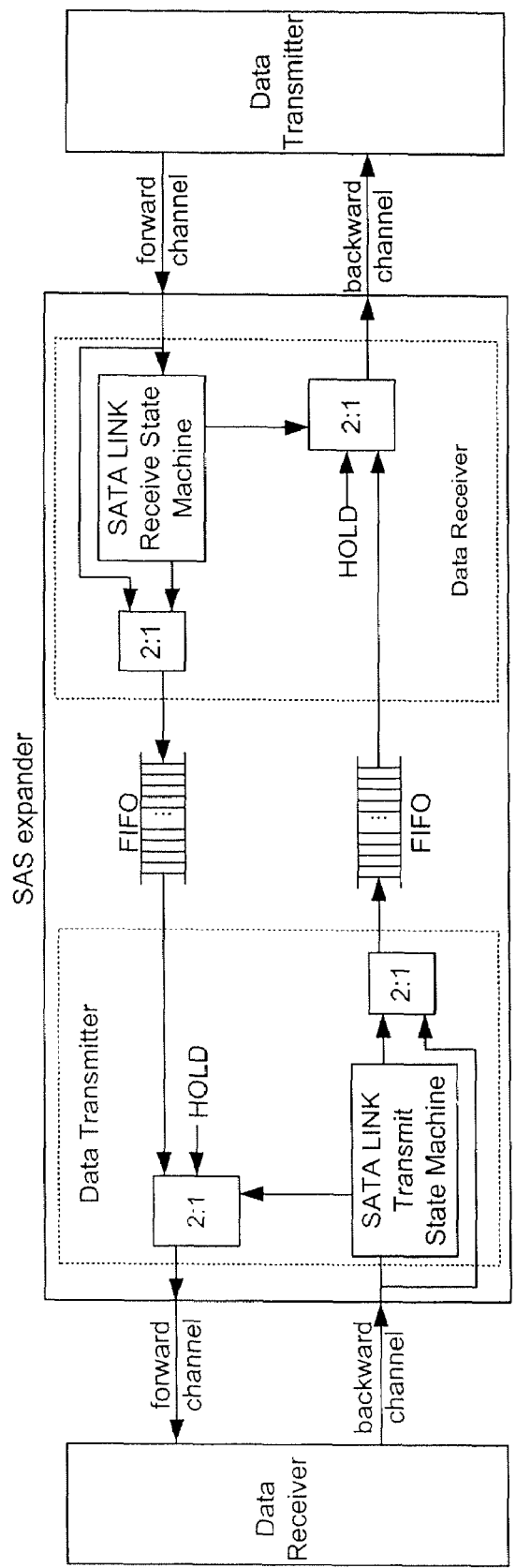
FIG. 6 illustrates an example of a known STP-connection expander architecture using a SATA link state machine per port.

FIG. 6 illustrates a possible in-connection (STP) expander architecture containing a SATA link state machine per port. Again, only the in-connection expander ports are shown. In such an intuitive scheme, each expander port effectively terminates all repeated primitives it receives and in turn generates repeated primitives for transmission in the egress direction. For the egress phy of an expander port, the transmitted Dword is sourced from its corresponding data path FIFO if the egress phy corresponds to the forward data channel. Otherwise, the transmitted Dword is generated by the port's embedded SATA link state machine. In the receive path, singular primitives, data Dwords, and the first primitive comprising a repeatable primitive sequence (representing state) are written to the data path buffer and only when the ingress phy corresponds to the forward data channel. In the backward channel, all but the first primitive of all primitive sequences received on the ingress phy are discarded (the first primitive of each repeated sequence is used to pass state information to the peer link state machine).

An analysis of the architecture shown by FIG. 6 has revealed a fundamental redundancy: ingress repeated primitives, which are discarded by an expander port are, for the most part, just regenerated by the peer port's state machine. For example, when a FIS transfer is initiated by a would-be data transmitter (i.e., end device), the data transmitter emits a continuous X_RDY sequence to the attached expander port. The corresponding expander port's SATA link state machine enters into a "ready-to-receive" state and transmits a continuous R_RDY primitive sequence onto the egress back channel. A single X_RDY primitive passed through the forward-channel data path buffer causes the peer port's state machine to enter into a "ready-to-transmit" state. Once in a "ready-to-transmit" state, the peer port emits a continuous X_RDY sequence onto the line. As can be seen, a received X_RDY primitive sequence is first terminated at one expander port, but then is regenerated at the peer expander port. Stripping out this extra processing results in a simplified and elegant expander architecture.

Figure 7:
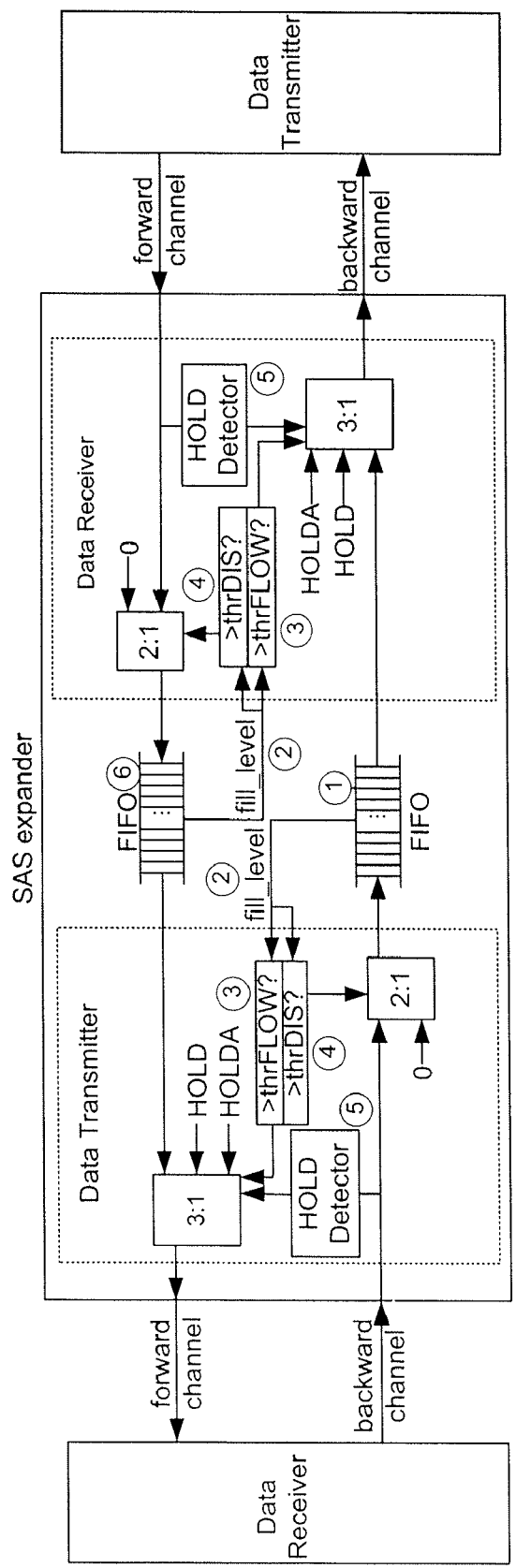
FIG. 7 illustrates an in-STP-connection expander architecture according to an embodiment of the present invention.
Figure 12:
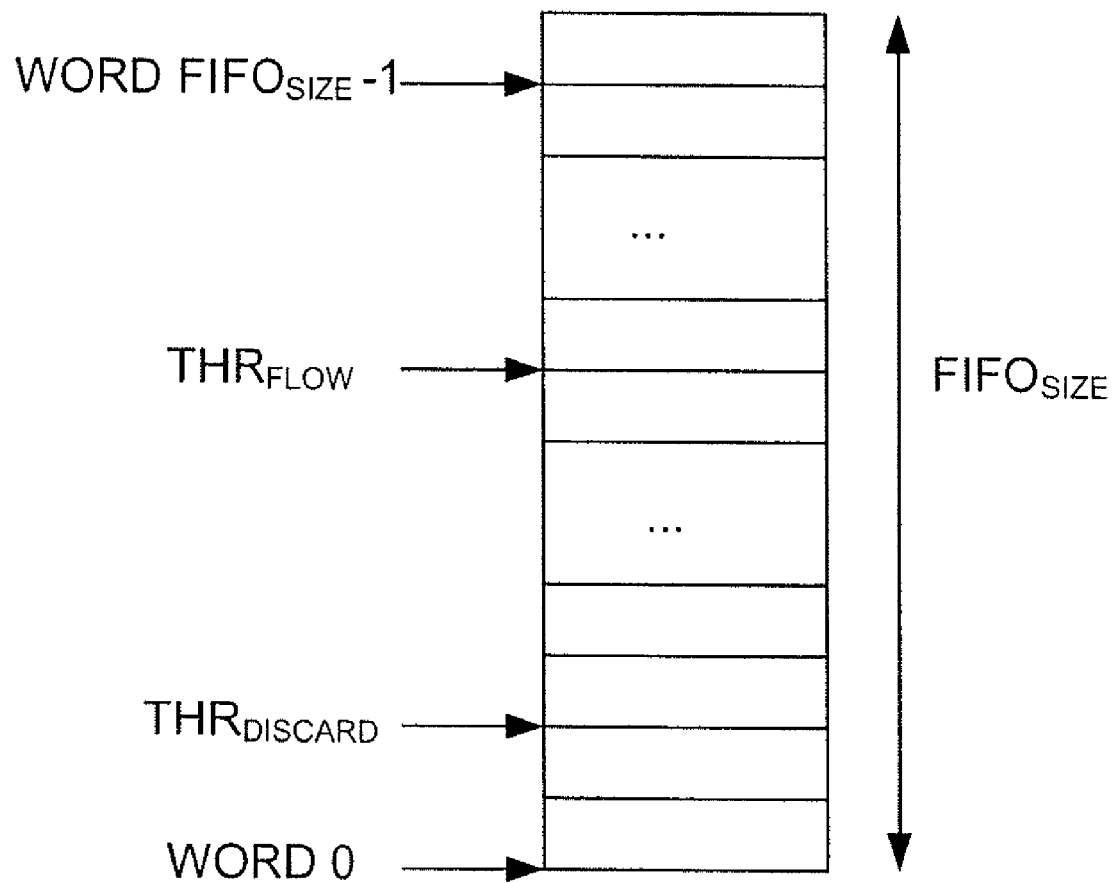
FIG. 12 illustrates an elastic buffer for use in an expander architecture according to an embodiment of the present invention.

In an architecture according to an embodiment of the present invention shown in FIG. 7, repeated primitives are no longer terminated at each expander port. Instead, they are conditionally terminated at each data path buffer. A programmable threshold associated with each data path buffer 1, 6 indicates whether a repeated primitive is to be written to the data path FIFO (the backward channel FIFO is labelled 1 in FIG. 7 and the forward channel FIFO is labelled 6, also in FIG. 7) or discarded: when the buffer fill level (represented by the signal labelled 2 in FIG. 7) is above this threshold (using the comparator labelled 4 in FIG. 7), received repeated primitives are discarded, provided the two previously written Dwords match the current Dword. A received Dword will be written to the buffer under all other scenarios. Keeping two of any received repeated primitive before allowing the same primitive to be discarded ensures that the expander will always transmit two or more of any repeated primitive, in accordance with the SATA protocol. In conjunction with the primitive discard threshold (thr$_{DISCARD}$), each elastic buffer is also associated with a second programmable flow control threshold (thr$_{FLOW}$) that facilitates correct flow control operation in an STP connection. As illustrated in FIG. 12 this flow control threshold should be set to a value that is greater than the discard threshold and should satisfy the following constraints:

1. FIFO$_{SIZE}$−thr$_{FLOW}$>T$_{LOOP}$
2. thr$_{FLOW}$>T$_{LOOP}$
3. thr$_{FLOW}$>>thr$_{DISCARD}$>0

The first constraint ensures that the elastic buffer will not overflow given a maximum flow control loop time (T$_{LOOP}$), after the expander port has started flow control. T$_{LOOP}$ refers to the maximum response time referenced in characteristics/requirements 2 and 3. The second constraint ensures that the elastic buffer will not starve once flow control is terminated. Finally, the third constraint ensures that flow control can only be started by an expander port if its egress phy is acting as a forward data channel. One presently preferred solution to this problem is to set the discard threshold and buffer size such that thr$_{FLOW}$>T$_{LOOP}$, FIFO$_{SIZE}$>2*thr$_{FLOW}$, and thr$_{DISCARD}$ is set to a value that is arbitrarily less than thr$_{FLOW}$ but greater than 0.

Flow control can be initiated by an expander port (i.e., emits HOLD primitives on the egress phy) when its ingress data path buffer fill level exceeds thr$_{FLOW}$ (determined using the comparator labelled 3 in FIG. 7). This occurs when its peer expander port is receiving HOLD primitives (as indicated by the primitive detector shown as a HOLD detector sub-block labelled 5 in FIG. 7), preventing Dwords from being read out of the data buffer. In this scheme, because each expander port is unable to differentiate between the forward data channel and the backward channel, received HOLD primitives should be unconditionally responded to with HOLDA primitives, to ensure that the forward channel flow control loop time requirement is met. It should be understood that while the comparators 3, 4 in conjunction with the fill level 2 form the basic form of a link connection controller, any suitable configuration may be possible so long as the link connection in STP flow control is performed in accordance with the present invention.

The problem of terminating STP flow control at a SAS expander port without introducing redundant processing can be solved using a single data path buffer per port (in the egress direction) while applying the following method of operation:

1. Generate HOLDA primitives on the egress phy when HOLD primitives are received on the ingress phy. These primitives should be generated quickly enough to satisfy the flow control loop time requirement, in the perspective of the initiator of the HOLDs.

2. When step 1 is not applicable, generate HOLD primitives on the egress phy (for any expander port) if the ingress data path buffer fill level is greater than thr$_{FLOW}$, where FIFO$_{SIZE}$−thr$_{FLOW}$>T$_{LOOP}$ and thr$_{FLOW}$>T$_{LOOP}$.

3. When steps 1 and 2 are not applicable, Dwords are read out from the egress data buffer and placed onto the egress phy. If the data buffer is empty, ALIGN primitives are inserted instead. This is in accordance with the SAS standard.

4. Discard all HOLDA primitives in the ingress path.

5. Discard all received repeatable primitives when the ingress data path buffer fill level is greater than thr$_{DISCARD}$, and when the two previously written Dwords match the current received Dword, where thr$_{FLOW}$>>thr$_{DISCARD}$>0.

6. When steps 4 and 5 are not applicable, write the incoming Dword into the ingress data buffer.

Figure 8:
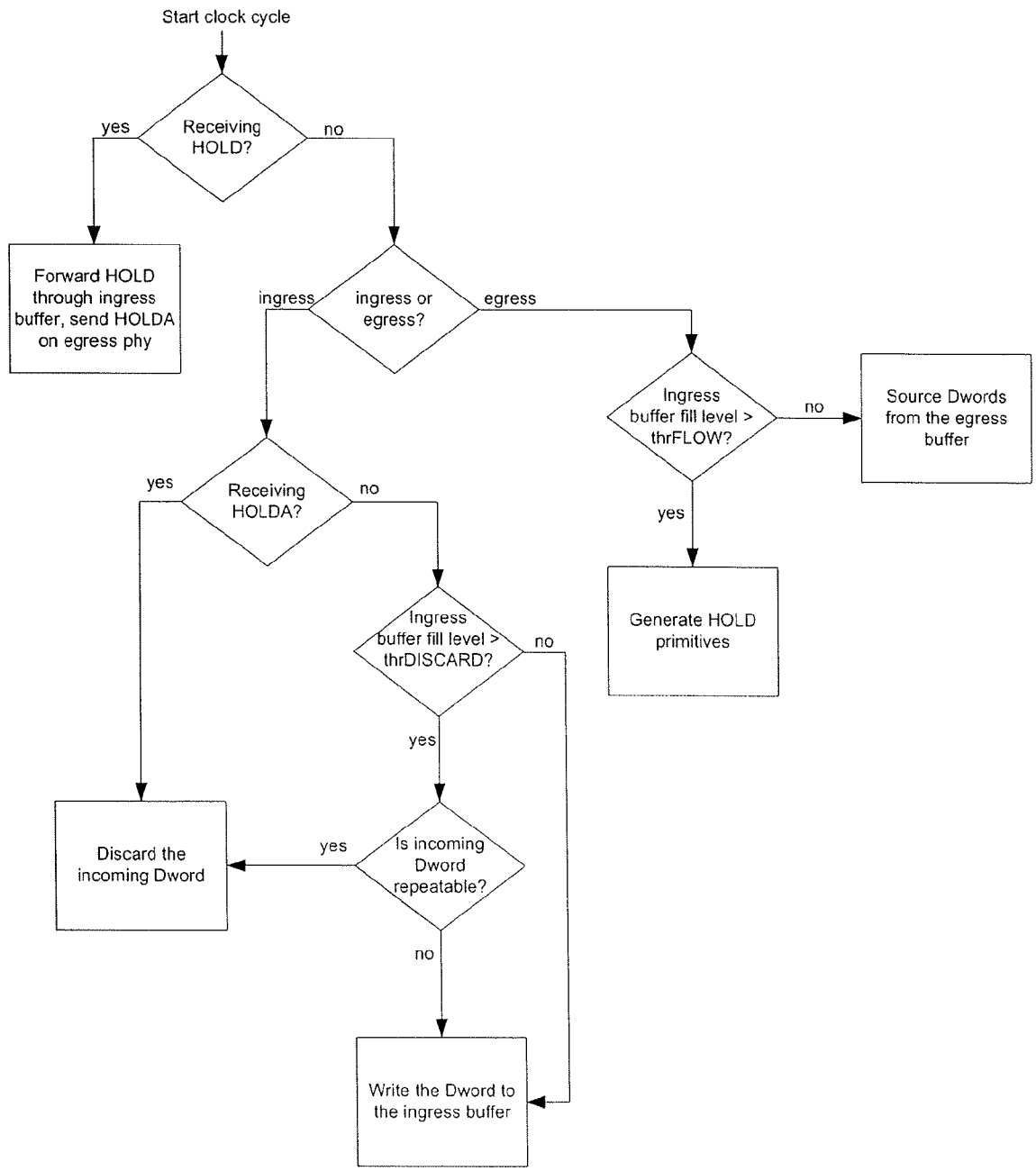
FIG. 8 is a flow chart illustrating a method according to an embodiment of the present invention for an ingress phy.
Figure 9:
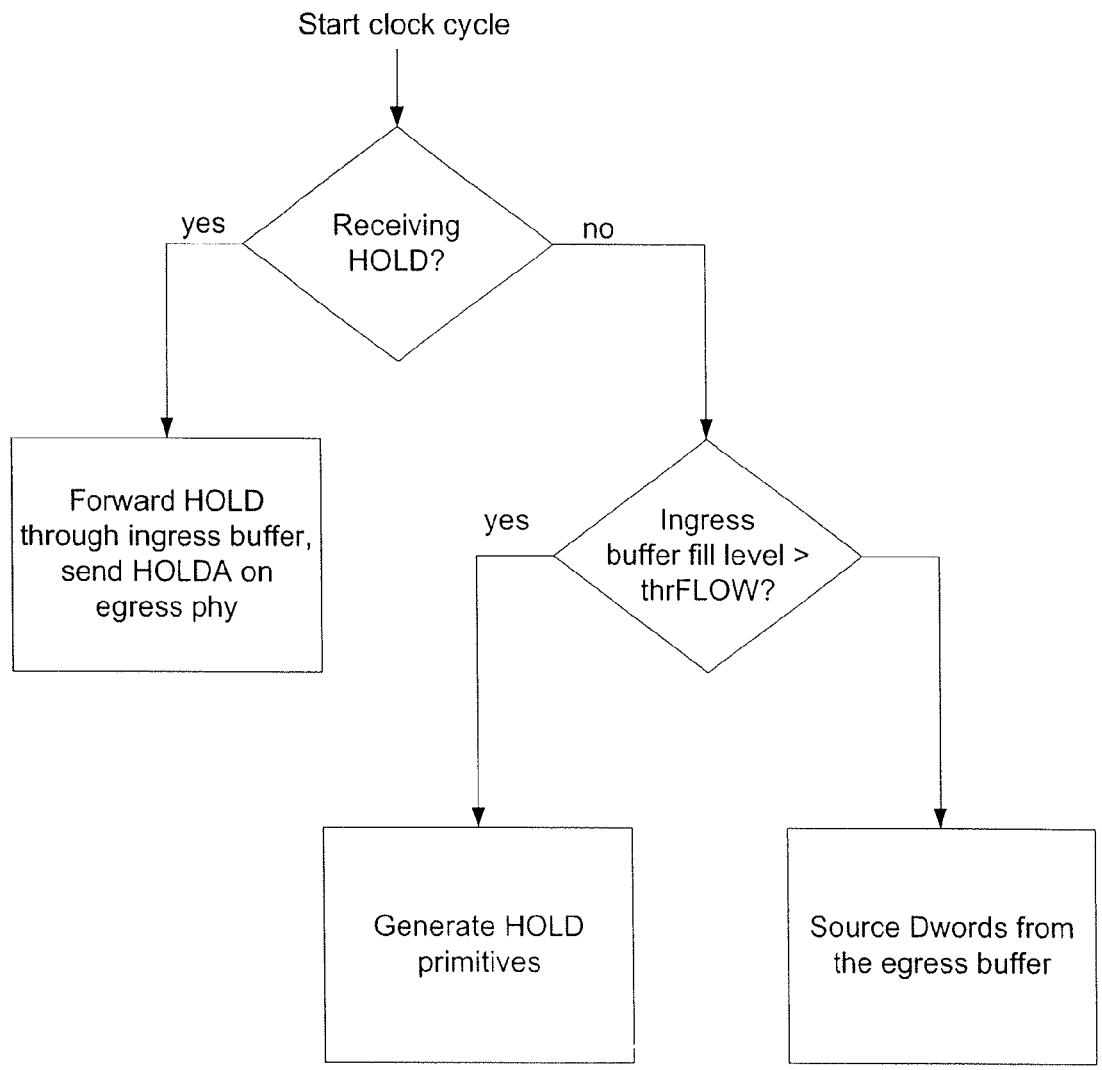
FIG. 9 is a flow chart illustrating a method according to an embodiment of the present invention for an egress phy.

Note that steps 2 and 3 are specific to the egress phy while steps 4-6 are specific to an ingress phy. The above method is captured in FIGS. 8 and 9, in which FIG. 8 is a flow chart illustrating a method according to an embodiment of the present invention for an ingress phy, and FIG. 9 is a flow chart illustrating a method according to an embodiment of the present invention for an egress phy. More specifically, FIG. 8 shows the method in accordance with the present invention where STP flow control in a SAS expander includes first forwarding primitives of a first type (e.g., HOLD) through an ingress buffer and sending primitives of a second type (e.g. HOLDA) on an egress buffer when primitives of the first type are received by the SAS expander. While HOLD and HOLDA are shown as examples of the primitives of the first type and second type, any SATA primitives can be designated within the intended scope of the present invention so long as they are interlocking relative to one another. Next, the method includes discarding a data word incoming to the SAS expander when primitives of the first type are not received by the SAS expander, but the primitives of the second type are received. Thereafter, the method includes writing the data word to the ingress buffer when neither the primitives of said first type nor the primitives of the second type are received by the SAS expander and a fill level of the ingress buffer is not greater than a threshold. It should be understood that the threshold is programmable at design of the SAS expander and depends upon the constraints as mentioned above. Such constraints may be found within the given system configuration including, but not limited to, physical layout and specific component selection.

With further regard to FIG. 8, the method next includes discarding the data word incoming to the SAS expander when neither the primitives of the first type nor the primitives of the second type are received by the SAS expander and the fill level of the ingress buffer is greater than the threshold and the data word is a repeatable data word. Thereafter, the method includes writing the data word to said ingress buffer when neither the primitives of the first type nor the primitives of the second type are received by the SAS expander and the fill level of the ingress buffer is greater than the threshold and the data word is not a repeatable data word.

In order to concur with the SATA standard, at least two data words are kept even when they are determined to be discardable (i.e., repeated primitives). As well, the threshold at which discard occurs provides the ingress buffer with a reserve portion of sufficient capacity to allow for storage of at least two transitions in primitive type. This would require at least six data word entries or more if more transitions than two are known or desirable. In such instances, the method of the present invention would include writing the data word to the ingress buffer when neither the primitives of the first type nor the primitives of the second type are received by the SAS expander and the fill level of the ingress buffer is greater than the threshold and the data word is a further primitive type not identical to either previous types of primitives.

With further reference to FIG. 9, the method of the present invention includes steps that occur when data flow is in a backward channel direction. In such instance, the method includes forwarding the primitives of the first type through the ingress buffer and sending the primitives of the second type on the egress buffer when the primitives of the first type are received by the SAS expander. However, the present method includes sourcing data words from the egress buffer when the primitives of the first type are not received by the SAS expander and the fill level of the ingress buffer is not greater than the flow control threshold. Further, the present method during backward flow of data includes generating data words identical to the primitives of the first type when the primitives of the first type are not received by the SAS expander and the fill level of the ingress buffer is greater than the flow control threshold.

Figure 10:
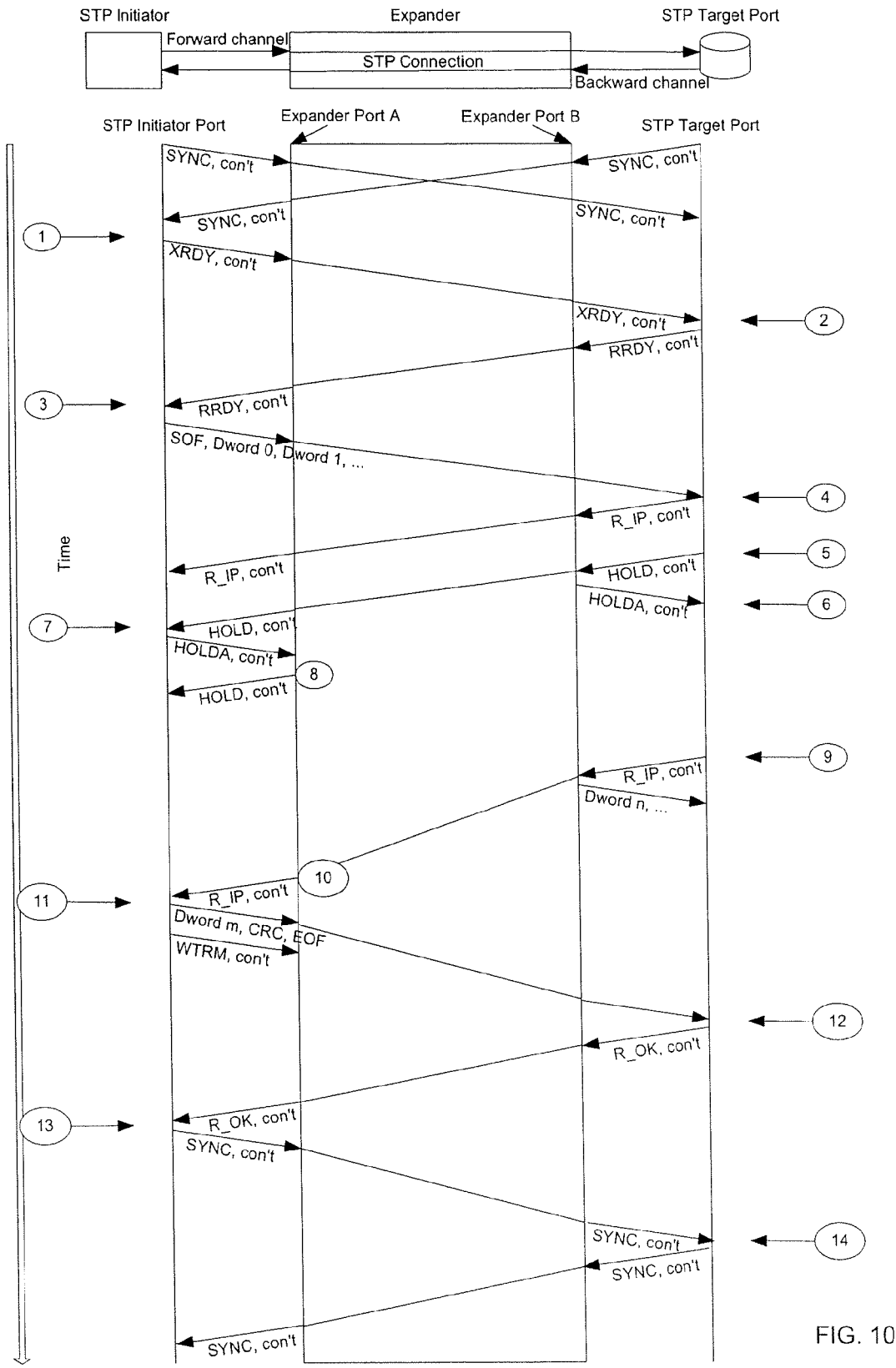
FIG. 10 is a flow diagram illustrating backward channel STP flow control operation according to an embodiment of the present invention.

The ability of the invention to facilitate STP flow control is best illustrated by examining some STP flow control scenarios. An example of backward channel STP flow control through an expander using an embodiment of the present invention is illustrated in FIG. 10. Table 2 describes in detail what is happening at each of the timestamps labelled 1 through 14 in FIG. 10:

TABLE 2

| Timestamp # | Description |
| --- | --- |
| 1 | STP initiator initiates a FIS transfer by transmitting a continuous, repeated X_RDY primitive sequence through the STP connection. While in connection, incoming Dwords are written to the ingress buffer for both ports (IA3 of FIG. 8) and outgoing Dwords are sourced from the egress buffer (EA3 of FIG. 9) until otherwise mentioned. |
| 2 | STP target receives X_RDY primitives (passed through the expander, which is acting as a wire) and indicates that it is ready to receive a FIS by returning a continuous repeated R_RDY primitive sequence through the backward channel. |
| 3 | STP initiator detects an R_RDY primitive sequence and begins FIS transmission. |
| 4 | Upon detecting an SOF primitive, the STP target indicates that reception is in progress by generating R_IP primitives on the backward channel. |
| 5 | The STP target data buffer is almost full. Therefore, it issues a request to stall data transmission by generating HOLD primitives on the back channel. |
| 6 | Expander port B responds to HOLD primitives immediately with HOLDA primitives (on the forward channel, corresponding to IA1 from FIG. 8 or EA1 from FIG. 9). As a result, the data buffer in the forward channel begins accumulating singular primitives and data Dwords. The HOLD primitives received at the expander port are also passed through the expander to the peer port and to the peer phy (again, corresponding to IA1). HOLDA primitives are received at the STP target port within one flow control loop time after it began generating HOLD primitives. |
| 7 | HOLD primitives generated by the STP target port and passed through the expander are detected at the STP initiator port. In turn, the STP initiator transmits HOLDA primitives back to the attached expander port. These HOLDA primitives are received within one flow control loop time. |
| 8 | When expander port B is receiving HOLD primitives and expander port A is receiving either singular primitives or data Dwords (i.e., in between timestamp 5 and 7), the fill level of the data buffer in the forward channel data path continually increases. When this fill level exceeds $thr_{FLOW}$, an indication is passed to expander port B, prompting it to generate HOLD primitives (EA2 in FIG. 9). Nothing has changed from the perspective of the STP initiator with the only difference being that expander port A begins generating HOLD primitives itself rather than simply passing them transparently. Also, when expander port A starts generating HOLD primitives, the fill level of the data buffer in the backward channel begins to increase. When this fill level exceeds $thr_{DISCARD}$, all repeated primitives on the backward channel are discarded thereafter (IA2 of FIG. 8), thereby maintaining a fill level of $\sim thr_{DISCARD} << thr_{FLOW}$ (i.e., HOLD primitives will not be generated by expander port B). |

TABLE 2-continued

| Timestamp # | Description |
| --- | --- |
| 9 | Here, the STP target port terminates its HOLD primitive sequence as its data buffer is no longer almost full. The STP target port resumes generating a R_IP primitive sequence. Expander port B passes Dwords accumulated in the forward channel data path buffer to the STP target port. These Dwords are received by the STP target port within one flow control loop time. |
| 10 | As port B now sources Dwords from the forward channel data path buffer (EA3 of FIG. 9) but port A is still receiving HOLDA primitives, which are discarded (IA2 of FIG. 8), the fill level begins to decrease. Once the fill level drops below $thr_{FLOW}$, port A ceases HOLD primitive generation, empties its (egress) data path buffer, and eventually begins forwarding R_IP primitives received from port B (continuously chooses EA3 of FIG. 9). |
| 11 | When the STP initiator stops receiving a HOLD primitive sequence (i.e., receives R_IP primitives), it resumes transmitting the data FIS. Expander port A receives data Dwords within one flow control loop time after sending R_IP primitives. |
| 12 | Once the last of the FIS is received by the STP target, it checks the CRC Dword and returns the appropriate result via either a R_OK primitive sequence or a R_ERR primitive sequence. |
| 13 | When the STP initiator receives R_OK or R_ERR, it begins transmitting SYNC primitives. |
| 14 | When the STP target receives SYNC primitives, it will return to an idle state and send SYNC primitives on the back channel. |

From the perspective of the STP initiator and the STP target, the FIS transfer occurs as described earlier. In reality, the respective states of the transmitter and receiver can fall out of alignment once flow control kicks in. This can be compensated for through careful management of the data path elastic buffers. Selective discard of received repeated primitives coupled with the timely generation of HOLD primitives ensures that singular primitives and data Dwords are buffered then forwarded when flow control is initiated inside an STP connection. Since repeated primitives only represent state, they can be discarded without loss of information. What renders such primitives discardable is that the primitives are interlocked (i.e., interlocking) between the transmitter and receiver.

Note that the fill level of the back-channel data buffer cannot materially exceed $thr_{DISCARD}$. This is because all received repeatable primitives are discarded (beyond two consecutive) when the fill level is greater than $thr_{DISCARD}$ and because all Dwords sent on the back channel are repeatable primitives (as per the SATA standard). A corollary to this rule is that HOLD primitives will never be generated by an expander port in the forward data channel (but can be passed transparently when received).

Figure 11:
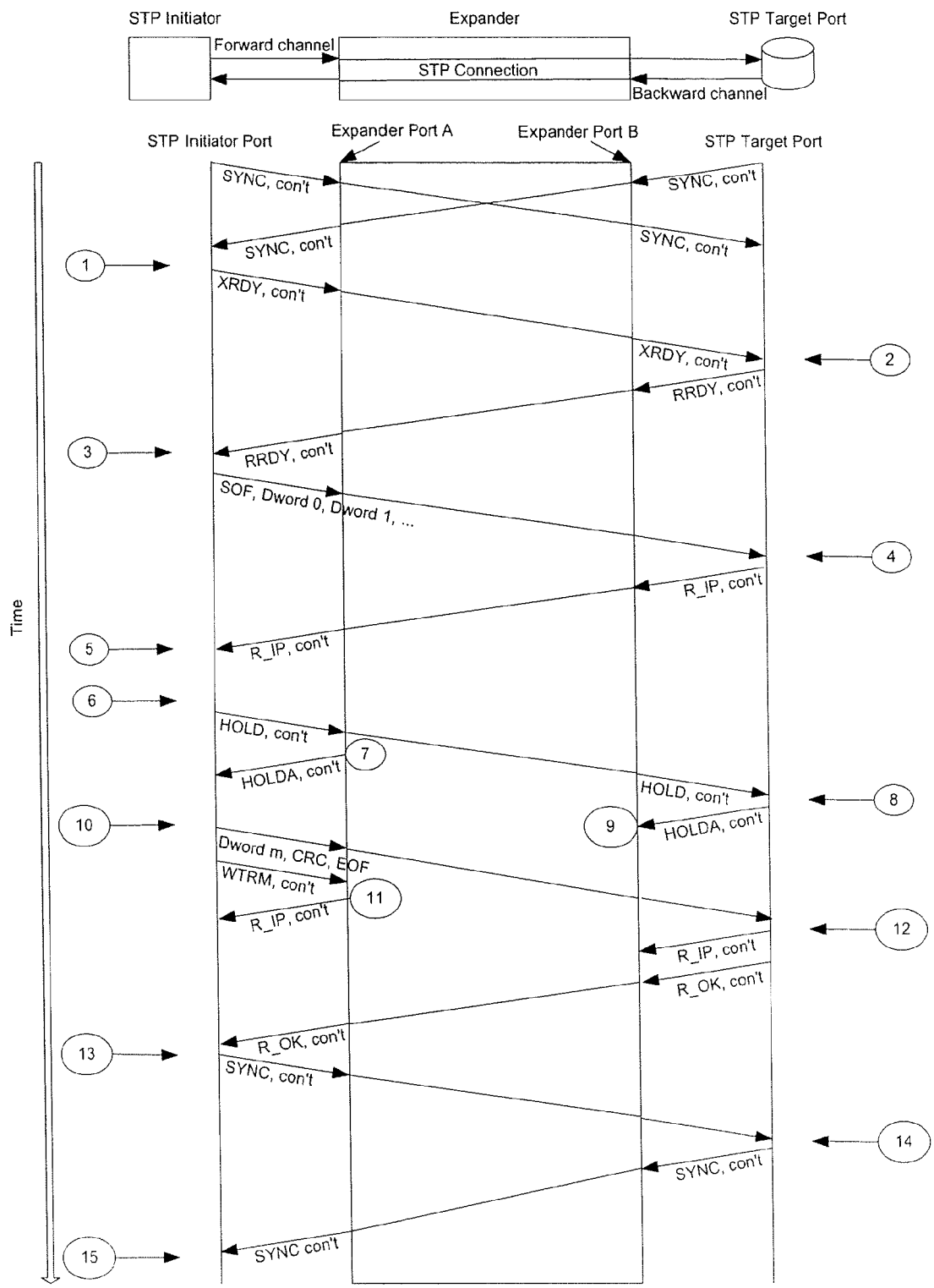
FIG. 11 is a flow diagram illustrating forward channel STP flow control operation according to an embodiment of the present invention.

Embodiments of the present invention also support forward channel STP flow control. An example is shown in FIG. 11. Table 3 provides details of the operation, describing what is happening at each of the timestamps labelled 1 to 15 in FIG. 11.

TABLE 3

| Timestamp # | Description |
| --- | --- |
| 1 | STP initiator initiates a FIS transfer by transmitting a continuous, repeated X_RDY primitive sequence through the STP connection. While in connection, incoming Dwords |

TABLE 3-continued

| Timestamp # | Description |
|---|---|
|  | are written to the ingress buffer for both ports (IA3 of FIG. 8) and outgoing Dwords are sourced from the egress buffer EA3 of FIG. 9 until otherwise mentioned. |
| 2 | STP target receives X_RDY primitives (passed through the expander, which is acting as a wire) and indicates that it is ready to receive a FIS by returning a continuous repeated R_RDY primitive sequence through the backward channel. |
| 3 | STP initiator detects an R_RDY primitive sequence and begins FIS transmission. |
| 4 | Upon detecting an SOF primitive, the STP target indicates that reception is in progress by generating R_IP primitives on the backward channel. R_IP primitives are passed transparently through the expander. |
| 5 | R_IP primitives are received by the STP initiator and ignored. |
| 6 | STP initiator sends HOLD primitives to indicate that it no longer has data to send. |
| 7 | Expander port A responds with HOLDA primitives within one flow control loop time (IA1 of FIG. 8 or EA1 of FIG. 9). The back-channel data buffer accumulates at most $thr_{DISCARD}$, repeatable primitives (all other received primitives are discarded, per IA2 of FIG. 8). Received HOLD primitives are forwarded to the peer port (IA1 of FIG. 8). |
| 8 | STP target receives forwarded HOLD primitives and responds with a HOLDA primitive sequence. |
| 9 | Expander port B receives HOLDA primitives within one flow control loop time of sending HOLD. These HOLDA primitives are discarded (IA2 of FIG. 8). |
| 10 | STP initiator resumes and completes FIS transfer. Subsequently, the initiator sends a WTRM sequence. |
| 11 | Expander port A resumes forwarding Dwords stored in its (egress) data buffer (EA3 of FIG. 9). |
| 12 | STP target detects resumption of data FIS. In response, the STP target sends an R_IP primitive sequence in the back channel. Following EOF, the STP target checks the validity of the associated CRC Dword and returns either a R_OK sequence (when the CRC Dword is correct) or a R_ERR sequence (otherwise). |
| 13 | When the STP initiator receives R_OK or R_ERR, it begins transmitting SYNC primitives. |
| 14 | When the STP target receives SYNC primitives, it will return to an idle state and send SYNC primitives on the back channel. |
| 15 | Upon receiving SYNC, the STP initiator returns to an idle state. |

The method according to an embodiment of the present invention that has been outlined simultaneously satisfies the SATA flow control loop time requirements, ensures that received data Dwords are never discarded, and prevents the data path buffers from overflowing. According to this preferred embodiment, the SATA flow control loop time requirement will always be met (i.e., HOLDA primitives are received by the initiator of HOLD primitives within one flow control loop time, corresponding to characteristics/requirements 1 and 4 of section 5) since responding to HOLD primitives with HOLDA has the highest priority in the method flow chart. Also, the flow control loop time is primarily dependent on the hardware processing time (i.e., the time for the expander port control logic to respond to a received HOLD primitive), which is much less than the flow control loop time requirement. In an apparatus according to an embodiment of the present invention, this processing time is a mere 5 Dwords, versus the 19 or 20 Dword requirement described earlier, and can be broken down as follows: 1 Dword to detect HOLD and generate an indicator signal, 3 Dwords to synchronize the indicator signal from the receive clock domain to the transmit clock domain, and 1 Dword to generate a HOLDA primitive response.

As described earlier, an expander port must transmit HOLD primitives when it is only capable of receiving 21 Dwords while acting as a SATA host port (i.e., is connected to a SATA drive), or 24/28 Dwords while acting as a STP host port (i.e., is connected to another expander or to an HBA) when the line rate is 1.5 Gbps/3.0 Gbps (characteristics/requirements 2 and 3 mentioned earlier). All of these requirements are satisfied by ensuring that the worst-case number of Dwords in any mode can be accommodated. That is, this requirement is satisfied universally by setting the $FIFO_{SIZE}$ and $thr_{FLOW}$ parameters such that $FIFO_{SIZE} - thr_{FLOW} > T_{LOOP} = 28$.

Finally, characteristics/requirements 5 and 6 mentioned earlier are also met by embodiments of the present invention. In particular, the backward channel of an STP connection (expander port) should only send HOLD primitives while it is in the middle of receiving a FIS or after receiving a FIS but before R_OK/R_ERR is transmitted. This requirement is met since the forward channel buffer can fill up, triggering HOLD primitive generation in the back channel, only while in the middle of a FIS transfer and only after flow control is initiated by an end device. As per the SATA standard, flow control can be initiated only after a FIS transfer has begun. Furthermore, the only way the back channel could be transmitting (forwarding) R_OK/R_ERR is if the receiver end device had already received the EOF primitive, effectively completing the FIS transfer. However, this is not possible because the SATA standard requires that WTRM primitives be transmitted immediately following EOF during a FIS transfer. Since WTRM primitives are repeatable, they cannot cause the forward channel buffer to fill up (they would be discarded). Thus, HOLD primitive generation due to the forward channel buffer filling up cannot occur except in the middle of a FIS transfer, which satisfies characteristic/requirement 5. The other reason for an expander port to transmit a HOLD primitive is when one is passed transparently through while in connection. In order to violate characteristic/requirement 5, an expander port would have to forward a HOLD primitive after it has already forwarded an R_OK/R_ERR primitive. This is a direct violation of the SATA standard as HOLD cannot be sent once R_OK/R_ERR has been sent. Again, requirement 5 is satisfied.

It is also easy to see that characteristic/requirement 6 is met using the following reasoning: since all received Dwords on the back-channel are, by definition (according to the SATA specification), repeatable, and because HOLD primitives in the forward channel are generated (i.e., not transmitting because of forwarding) as a result of the ingress data path buffer fill level (i.e., back-channel data path buffer), then with a repeatable primitive discard mechanism in place, and a discard threshold, $thr_{DISCARD}$, set to a value $<< thr_{FLOW}$, it is improbable, and in some cases impossible, for the fill level of the ingress data buffer to exceed $thr_{DISCARD}$. Hence, the data transmitter (expander port forward channel) cannot initiate flow control as a result of a request generated by the ingress data path buffer. HOLD primitives will be transmitted only when they are forwarded through the forward channel data path buffers. As per the SATA standard, these are sent in a forward channel only while in the middle of a FIS.

The current method also ensures that received data Dwords are rarely, or in some cases never, discarded or cause a data path buffer overflow by triggering HOLD primitive transmission once the ingress data path buffer can no longer accommodate $T_{LOOP}$ more incoming Dwords. Furthermore, when a HOLD primitive sequence is generated by an expander port, the state machine controlling the far-end (data transmitter) can only be in one of two states: a data transmit state, in which case it will respond to the generated HOLD primitives with HOLDA primitives; or a wait for termination state, in which case the generated HOLD primitives are ignored and a continuous WTRM primitive sequence is sent back. In both cases, the expander port discards the received repeatable primitives, preventing buffer overflow. For the back channel, the repeatable primitive discard mechanism alone is sufficient in preventing buffer overflow, since all received Dwords are also repeatable primitives.

It should be readily apparent to one of ordinary skill in the art that various embodiments of the present invention can be implemented in various Application Specific Standard Products (ASSPs) such as, but not limited to, a 12-port SAS expander or a 36-port SAS expander. In such implementations, STP flow control would be controlled by a macro-block within the given SAS expander. One instance of each macro-block could exist in every port of the respective device. The core logic would, at a minimum, include an elastic buffer for buffering the data stream between the sender and receiver, a primitive decoder for identifying repeated primitives from among the data stream, and a link connection controller. As discussed before, the link controller would conditionally terminate the repeated primitives at the elastic buffer by filling the elastic buffer with the data stream up to a predetermined threshold that allows a reserved portion of the elastic buffer to be filled with at least two of the repeated primitives while discarding subsequent identical repeated primitives. The reserved portion of the elastic buffer could store at least two subsequent non-identical repeated primitives in a similar manner, and could be large enough to store several transitions in the type of repeated primitive. Other configurations should be considered well within the intended scope of the present invention.

Embodiments of the present invention can be described as an STP flow control mechanism using a dual threshold FIFO. Repeatable primitives can be discarded after a discard threshold is met, and flow control can be initiated after a flow control threshold is met. HOLD primitives can be forwarded through a data path FIFO and HOLDA primitives can be discarded. STP flow control can be governed by steps, or rules, as described earlier. Received HOLD primitives can be responded to with HOLDA primitives within a specified number of Dwords, and received HOLDA primitives can be discarded. Repeatable primitives can be selectively discarded. HOLD primitives can be generated based on a programmable threshold and a data path buffer fill level.

A method according to an embodiment of the present invention can include the steps illustrated in FIG. 8, and another method according to an embodiment of the present invention can include the steps illustrated in FIG. 9. These methods can be implemented by way of, or in, an apparatus such as the SAS expander generally illustrated in FIG. 7. Such an apparatus can include the following sub-blocks: elastic FIFO, primitive decoder, transmit and receive FIFOs, transmit FIFO reader, receive FIFO writer, and a link connection controller.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of serial advanced technology attachment tunneling protocol (STP) flow control in a serial attached small computer system interface (SAS) expander, said method comprising:

when primitives of a first type are received by said SAS expander, forwarding said primitives of said first type through an ingress buffer and sending primitives of a second type on an egress buffer;

when said primitives of said first type are not received by said SAS expander, but said primitives of said second type are received, discarding a data word incoming to said SAS expander;

when neither said primitives of said first type nor said primitives of said second type are received by said SAS expander and a fill level of said ingress buffer is not greater than a threshold, writing said data word to said ingress buffer;

when neither said primitives of said first type nor said primitives of said second type are received by said SAS expander and said fill level of said ingress buffer is greater than said threshold and said data word is a repeatable data word, discarding said data word incoming to said SAS expander; and when neither said primitives of said first type nor said primitives of said second type are received by said SAS expander and said fill level of said ingress buffer is greater than said threshold and said data word is not a repeatable data word, writing said data word to said ingress buffer;

wherein said primitives of said first type and said primitives of said second type are interlocking relative to one another.

2. The method as claimed in claim 1, wherein said primitives of said first type are HOLD primitives and said primitives of said second type are HOLDA primitives.

3. The method as claimed in claim 1, further comprising a step of:

when neither said primitives of said first type nor said primitives of said second type are received by said SAS expander and said fill level of said ingress buffer is greater than said threshold and said data word is a further primitive type not identical to either said primitives of said first type nor said primitives of said second type, writing said data word to said ingress buffer.

4. The method as claimed in claim 3, wherein said threshold is programmable and provides said ingress buffer with a reserve portion having storage capacity for at least two transitions in primitive type.

5. The method as claimed in claim 3, wherein said threshold within said ingress buffer is determined by constraints of discard threshold, ($thr_{DISCARD}$), flow control threshold, ($thr_{FLOW}$), maximum flow control loop time, ($T_{LOOP}$), and size of said ingress buffer, ($FIFO_{SIZE}$), where:

$thr_{FLOW} > T_{LOOP}$, $FIFO_{SIZE} > 2*thr_{FLOW}$, and $thr_{DISCARD}$ is set to a value that is less than $thr_{FLOW}$ but greater than 0.

6. The method as claimed in claim 5, wherein:

when data flow is in a backward channel direction and said primitives of said first type are received by said SAS expander, forwarding said primitives of said first type through said ingress buffer and sending said primitives of said second type on said egress buffer;

when data flow is in said backward channel direction and said primitives of said first type are not received by said SAS expander and said fill level of said ingress buffer is not greater than said flow control threshold, sourcing data words from said egress buffer;

when data flow is in said backward channel direction and said primitives of said first type are not received by said SAS expander and said fill level of said ingress buffer is greater than said flow control threshold, generating data words identical to said primitives of said first type.

7. The method as claimed in claim 6, wherein said primitives of said first type are HOLD primitives and said primitives of said second type are HOLDA primitives.

* * * * *